United States Patent
Jang

(10) Patent No.: US 11,302,911 B2
(45) Date of Patent: Apr. 12, 2022

(54) PARTICULATES OF POLYMER ELECTROLYTE-PROTECTED ANODE ACTIVE MATERIAL PARTICLES FOR LITHIUM-ION BATTERIES

(71) Applicant: Nanotek Instruments, Inc., Dayton, OH (US)

(72) Inventor: Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 309 days.

(21) Appl. No.: 16/410,152

(22) Filed: May 13, 2019

(65) Prior Publication Data

US 2020/0365880 A1    Nov. 19, 2020

(51) Int. Cl.
| | |
|---|---|
| H01M 4/36 | (2006.01) |
| H01M 10/0525 | (2010.01) |
| H01M 10/0565 | (2010.01) |
| H01M 4/62 | (2006.01) |
| H01M 4/02 | (2006.01) |

(52) U.S. Cl.
CPC .......... *H01M 4/366* (2013.01); *H01M 4/622* (2013.01); *H01M 10/0525* (2013.01); *H01M 10/0565* (2013.01); *H01M 2004/021* (2013.01); *H01M 2004/027* (2013.01); *H01M 2300/0082* (2013.01); *H01M 2300/0091* (2013.01)

(58) Field of Classification Search
CPC .......... H01M 4/36; H01M 4/366; H01M 4/62; H01M 4/622; H01M 10/0525; H01M 10/0565
See application file for complete search history.

(56) References Cited

U.S. PATENT DOCUMENTS

| | | |
|---|---|---|
| 2,798,878 A | 7/1957 | Hummers |
| 10,122,044 B2 | 11/2018 | Tan et al. |
| 2005/0136330 A1 | 6/2005 | Mao et al. |
| 2008/0050658 A1 | 2/2008 | Abe et al. |
| 2011/0165466 A1 | 7/2011 | Zhamu et al. |
| 2012/0064409 A1 | 3/2012 | Zhamu et al. |
| 2013/0040197 A1 | 2/2013 | Liu et al. |

(Continued)

OTHER PUBLICATIONS

U.S. Appl. No. 16/380,341 Nonfinal Office Action dated Apr. 2, 2021, 10 pages.

(Continued)

*Primary Examiner* — Karie O'Neill Apicella

(57) ABSTRACT

The disclosure provides multi-functional composite particulates for a lithium battery, wherein at least one of the composite particulates has a diameter from 100 nm to 50 μm and comprises a polymer electrolyte matrix comprising a lithium salt dissolved or dispersed in the polymer electrolyte matrix and one or a plurality of primary particles of an anode active material that are encapsulated by, embedded in, dispersed in, or bonded by the polymer electrolyte having a lithium ion conductivity from $10^{-8}$ to $5\times10^{-2}$ S/cm, wherein the primary particles have a diameter or thickness from 0.5 nm to 20 μm and occupy a weight fraction from 5% to 98% based on the total weight of the composite particulate. Also provided is a method of producing such composite particulates, an anode electrode comprising these particulates, and a lithium cell.

25 Claims, 7 Drawing Sheets

(56) References Cited

U.S. PATENT DOCUMENTS

| | | |
|---|---|---|
| 2013/0224632 A1 | 8/2013 | Roumi |
| 2014/0045065 A1 | 2/2014 | Bao et al. |
| 2014/0242458 A1 | 8/2014 | Abe et al. |
| 2014/0255794 A1 | 9/2014 | Zhang et al. |
| 2015/0221935 A1 | 8/2015 | Zhou et al. |
| 2016/0294000 A1 | 10/2016 | He et al. |
| 2016/0351909 A1 | 12/2016 | Bittner et al. |
| 2017/0179468 A1 | 6/2017 | Fanous et al. |
| 2017/0194648 A1 | 7/2017 | Bucur et al. |
| 2017/0288211 A1 | 10/2017 | Zhamu et al. |
| 2017/0338472 A1 | 11/2017 | Zhamu et al. |
| 2018/0051137 A1 | 2/2018 | Kim et al. |
| 2018/0166759 A1 | 6/2018 | Zhamu et al. |
| 2018/0301707 A1 | 10/2018 | Pan et al. |
| 2018/0351201 A1* | 12/2018 | Zhamu .................. H01G 11/50 |
| 2020/0358081 A1* | 11/2020 | Lin ....................... H01M 4/366 |

OTHER PUBLICATIONS

U.S. Appl. No. 16/404,109 Nonfinal Office Action dated Feb. 18, 2021, 7 pages.

U.S. Appl. No. 16/404,111 Nonfinal Office Action dated Dec. 9, 2020, 6 pages.

U.S. Appl. No. 16/407,731 Nonfinal Office Action dated Apr. 19, 2021, 21 pages.

Gurunathan et al., "Synthesis of Hierarchically Porous SnO2 Microspheres and Performance Evaluation as Li-Ion Battery Anode by Using Different Binders" ACS Appl. Mater. Inter. (2014) vol. 6, No. 19, pp. 16556-16564.

GE, M, et al.; Review of porous silicon preparation and its application for lithium-ion battery anodes, Nanotechnology 24 (2013) 422001.

U.S. Appl. No. 16/407,731; Final Office Action dated Nov. 16, 2021; 39 pages.

* cited by examiner

PARTICULATES OF POLYMER ELECTROLYTE-PROTECTED ANODE ACTIVE MATERIAL PARTICLES FOR LITHIUM-ION BATTERIES

FIELD

The present disclosure relates generally to the field of lithium-ion batteries and, in particular, to composite particulates for use in the anode of a lithium-ion battery.

BACKGROUND

A unit cell or building block of a lithium-ion battery is typically composed of an anode current collector, an anode or negative electrode layer (containing an anode active material responsible for storing lithium therein, a conductive additive, and a resin binder), an electrolyte and porous separator, a cathode or positive electrode layer (containing a cathode active material responsible for storing lithium therein, a conductive additive, and a resin binder), and a separate cathode current collector. The electrolyte is in ionic contact with both the anode active material and the cathode active material. A porous separator is not required if the electrolyte is a solid-state electrolyte.

The binder in the binder layer is used to bond the anode active material (e.g. graphite or Si particles) and a conductive filler (e.g. carbon black or carbon nanotube) together to form an anode layer of structural integrity, and to bond the anode layer to a separate anode current collector, which acts to collect electrons from the anode active material when the battery is discharged. In other words, in the negative electrode (anode) side of the battery, there are typically four different materials involved: an anode active material, a conductive additive, a resin binder (e.g. polyvinylidine fluoride, PVDF, or styrene-butadiene rubber, SBR), and an anode current collector (typically a sheet of Cu foil). Typically the former three materials form a separate, discrete anode layer and the latter one forms another discrete layer.

The most commonly used anode active materials for lithium-ion batteries are natural graphite and synthetic graphite (or artificial graphite) that can be intercalated with lithium and the resulting graphite intercalation compound may be expressed as $Li_xC_6$, where x is typically less than 1. The maximum amount of lithium that can be reversibly intercalated into the interstices between graphene planes of a perfect graphite crystal corresponds to x=1, defining a theoretical specific capacity of 372 mAh/g.

Graphite or carbon anodes can have a long cycle life due to the presence of a protective solid-electrolyte interface layer (SEI), which results from the reaction between lithium and the electrolyte (or between lithium and the anode surface/edge atoms or functional groups) during the first several charge-discharge cycles. The lithium in this reaction comes from some of the lithium ions originally intended for the purpose of the charge transfer between an anode and a cathode. As the SEI is formed, the lithium ions become part of the inert SEI layer and become irreversible, i.e. these positive ions can no longer be shuttled back and forth between the anode and the cathode during subsequent charges/discharges. Therefore, it is desirable to use a minimum amount of lithium for the formation of an effective SEI layer. In addition to SEI formation, the irreversible capacity loss $Q_{ir}$ can also be attributed to graphite exfoliation caused by electrolyte/solvent co-intercalation and other side reactions.

In addition to carbon- or graphite-based anode materials, other inorganic materials that have been evaluated for potential anode applications include metal oxides, metal nitrides, metal sulfides, and the like, and a range of metals, metal alloys, and intermetallic compounds that can accommodate lithium atoms/ions or react with lithium. Among these materials, lithium alloys having a composition formula of $Li_aA$ (A is a metal or semiconductor element, such as Al and Si, and "a" satisfies $0<a\leq5$) are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), $LiZn$ (410 mAh/g), and $Li_3Bi$ (385 mAh/g). However, as schematically illustrated in FIG. 2(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

To overcome the problems associated with such mechanical degradation, three technical approaches have been proposed:

(1) reducing the size of the active material particle, presumably for the purpose of reducing the total strain energy that can be stored in a particle, which is a driving force for crack formation in the particle. However, a reduced particle size implies a higher surface area available for potentially reacting with the liquid electrolyte to form a higher amount of SEI. Such a reaction is undesirable since it is a source of irreversible capacity loss.

(2) depositing the electrode active material in a thin film form directly onto a current collector, such as a copper foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area (even though the capacity per unit mass can be large). Such a thin film must have a thickness less than 100 nm to be more resistant to cycling-induced cracking, further diminishing the total lithium storage capacity and the lithium storage capacity per unit electrode surface area. Such a thin-film battery has very limited scope of application. A desirable and typical electrode thickness is from 100 μm to 200 μm. These thin-film electrodes (with a thickness of <500 nm or even <100 nm) fall short of the required thickness by three (3) orders of magnitude, not just by a factor of 3.

(3) using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nanoparticles. Presumably, the protective matrix provides a cushioning effect for particle expansion or shrinkage, and prevents the electrolyte from contacting and reacting with the electrode active material. Examples of high-capacity anode active particles are Si, Sn, and $SnO_2$. Unfortunately, when an active material particle, such as Si particle, expands (e.g. up to a volume expansion of 380%) during the battery charge step, the protective coating is easily broken due to the mechanical weakness and/o brittleness of the protective coating materials. There has been no high-strength and high-toughness material available that is itself also lithium ion conductive.

It may be further noted that the coating or matrix materials used to protect active particles (such as Si and Sn) are carbon, sol gel graphite, metal oxide, monomer, ceramic, and lithium oxide. These protective materials are all very brittle, weak (of low strength), and/or non-conductive to lithium ions (e.g., ceramic or oxide coating). Ideally, the protective material should meet the following requirements: (a) The protective material must be lithium ion-conducting as well as initially electron-conducting (when the anode electrode is made) and be capable of preventing liquid electrolyte from being in constant contact with the anode active material particles (e.g. Si). (b) The protective material should also have high fracture toughness or high resistance to crack formation to avoid disintegration during cycling. (c) The protective material must be inert (inactive) with respect to the electrolyte, but be a good lithium ion conductor. (d) The protective material must not provide any significant amount of defect sites that irreversibly trap lithium ions. (e) The combined protective material-anode material structure must allow for an adequate amount of free space to accommodate volume expansion of the anode active material particles when lithiated. The prior art protective materials all fall short of these requirements. Hence, it is not surprising to observe that the resulting anode typically shows a reversible specific capacity much lower than expected. In many cases, the first-cycle efficiency is extremely low (mostly lower than 80% and some even lower than 60%). Furthermore, in most cases, the electrode was not capable of operating for a large number of cycles. Additionally, most of these electrodes are not high-rate capable, exhibiting unacceptably low capacity at a high discharge rate.

Due to these and other reasons, most of prior art composite electrodes and electrode active materials have deficiencies in some ways, e.g., in most cases, less than satisfactory reversible capacity, poor cycling stability, high irreversible capacity, ineffectiveness in reducing the internal stress or strain during the lithium ion insertion and extraction steps, and other undesirable side effects.

Complex composite particles of particular interest are a mixture of separate Si and graphite particles dispersed in a carbon matrix; e.g. those prepared by Mao, et al. ["Carbon-coated Silicon Particle Powder as the Anode Material for Lithium Batteries and the Method of Making the Same," US 2005/0136330 (Jun. 23, 2005)]. Also of interest are carbon matrix-containing complex nano Si (protected by oxide) and graphite particles dispersed therein, and carbon-coated Si particles distributed on a surface of graphite particles Again, these complex composite particles led to a low specific capacity or for up to a small number of cycles only. It appears that carbon by itself is relatively weak and brittle and the presence of micron-sized graphite particles does not improve the mechanical integrity of carbon since graphite particles are themselves relatively weak. Graphite was used in these cases presumably for the purpose of improving the electrical conductivity of the anode material. Furthermore, polymeric carbon, amorphous carbon, or pre-graphitic carbon may have too many lithium-trapping sites that irreversibly capture lithium during the first few cycles, resulting in excessive irreversibility.

In summary, the prior art has not demonstrated a material that has all or most of the properties desired for use as an anode active material in a lithium-ion battery. Thus, there is an urgent and continuing need for a new anode active material that enables a lithium-ion battery to exhibit a high cycle life, high reversible capacity, low irreversible capacity, small particle sizes (for high-rate capacity), and compatibility with commonly used electrolytes. There is also a need for a method of readily or easily producing such a material in large quantities.

Thus, it is a specific object of the present disclosure to meet these needs and address the issues associated the rapid capacity decay of a lithium battery containing a high-capacity anode active material.

SUMMARY

The present disclosure provides multi-functional composite particulates for a lithium battery, wherein at least one of the composite particulates has a diameter from 100 nm to 50 μm and comprises a polymer electrolyte, comprising from 0.1% to 40% by weight of a lithium salt dissolved or dispersed in the polymer electrolyte, and one or a plurality of primary particles of an anode active material that are encapsulated by, embedded in, dispersed in, or bonded by the polymer electrolyte having a lithium ion conductivity from $10^{-8}$ to $5\times10^{-2}$ S/cm, wherein the primary particles have a diameter or thickness from 0.5 nm to 20 μm and occupy a weight fraction from 5% to 98% based on the total weight of the composite particulate. The lithium salt is preferably in the amount from 1% to 30% by weight based on the total composite particulate weight. The multi-functional particulate may have a diameter preferably and typically from 500 nm to 50 μm, and more preferably and typically from 1 μm to 30 μm.

In certain embodiments, the polymer electrolyte comprises a polymer selected from poly(ethylene oxide) (PEO), polypropylene oxide (PPO), poly(ethylene glycol) (PEG), poly(acrylonitrile) (PAN), poly(methyl methacrylate) (PMMA), poly(vinylidene fluoride) (PVdF), Poly bis-methoxy ethoxyethoxide-phosphazenex, polyvinyl chloride, polydimethylsiloxane, poly(vinylidene fluoride)-hexafluoropropylene (PVDF-HFP), cyanoethyl poly(vinyl alcohol) (PVACN), a pentaerythritol tetraacrylate (PETEA)-based polymer, an aliphatic polycarbonate (including poly(vinylene carbonate) (PVC), poly(ethylene carbonate) (PEC), poly(propylene carbonate) (PPC), and poly(trimethylene carbonate) (PTMC)), a single Li-ion conducting solid polymer electrolyte with a carboxylate anion, a sulfonylimide anion, or sulfonate anion, a crosslinked electrolyte of poly (ethylene glycol)diacrylate (PEGDA) or poly(ethylene glycol)methyl ether acrylate, a sulfonated derivative thereof, or a combination thereof.

It may be noted that the polymers in the above list are commonly used as an ingredient in a gel polymer electrolyte or solid polymer electrolyte of a lithium-ion battery cell. These polymers, however, have not been previously used in a composite particulate as herein disclosed.

The lithium salt is preferably selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-methanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphate ($LiPF_3(CF_2CF_3)_3$), lithium bisperfluoroethylsulfonylimide (LiBETI), lithium bis (trifluoromethanesulfonyl)imide, lithium bis(fluorosulfonyl) imide, lithium trifluoromethanesulfonimide (LiTFSI), an ionic liquid-based lithium salt, or a combination thereof.

In the multi-functional composite particulates, the polymer electrolyte may be further impregnated with an organic liquid solvent, an ionic liquid, or a combination thereof. Such a liquid may be pre-impregnated into the electrolyte polymer during or after the composite particulates are made, but prior to being incorporated in the anode electrode and the fabrication of the battery cell. In certain embodiments, the liquid solvent or ionic liquid may get permeated into the polymer of the particulate from the liquid electrolyte of the cell per se.

The composite particulate is preferably further encapsulated by a shell of a conducting material selected from a graphene, carbon (e.g. carbon nanoparticles, carbon black, acetylene black, carbon nanotube, carbon nano-fiber, etc.), graphite (e.g. expanded graphene flakes, exfoliated graphite worms, nano-scaled or sub-micron-scaled graphite particles), conducting polymer, metal, composite, or a combination thereof. Preferably, the shell has an electrical conductivity from $10^{-8}$ S/cm to $10^3$ S/cm, more preferably from $10^{-5}$ S/cm to $10^2$ S/cm and further preferably at least $10^{-2}$ S/cm. The composite shell may include a polymer matrix composite (e.g. rubbery or elastomeric matrix, thermoplastic matrix, thermoset matrix, interpenetrating network matrix, etc.), metal matrix composite (e.g. Al, Zn, etc.), ceramic matrix composite (e.g. metal oxide and metal sulfide matrix), glass matrix composite, carbon matrix composite (e.g. amorphous carbon, CVD carbon, PVD carbon, sputtering carbon, polymeric carbon, etc.), and organic matrix composite. The shell preferably has a thickness from 0.34 nm (thickness of a pristine graphene) to 10 μm.

In some embodiments, the composite further comprises graphene sheets (inside the particulate core, in the encapsulating shell, or both) selected from pristine graphene, graphene oxide, reduced graphene oxide, graphene fluoride, graphene chloride, graphene bromide, graphene iodide, nitrogenated graphene, hydrogenated graphene, doped graphene, chemically functionalized graphene, or a combination thereof.

In some embodiments, the polymer electrolyte further comprises a reinforcement material or additive selected from carbon nanotubes, carbon nano-fibers, carbon or graphite fibers, graphene sheets, expanded graphite flakes, polymer fibrils, glass fibers, ceramic fibers, metal filaments or metal nano-wires, whiskers, carbon black, acetylene black, needle coke, carbon particles, graphite particles, or a combination thereof. The preferred amount of the reinforcement material or additive is from 1% to 30% by weight based on the total composite particulate weight.

The anode active material may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li having at least 60% by weight of lithium element therein; and (h) combinations thereof. The Li alloy may contain from 0.1% to 10% by weight of a metal element selected from Zn, Ag, Au, Mg, Ni, Ti, Fe, Co, V, Al, or a combination thereof.

The anode active material may contain a prelithiated Si, prelithiated Ge, prelithiated Sn, prelithiated $SnO_x$, prelithiated $SiO_x$, prelithiated iron oxide, prelithiated $Mn_3O_4$, prelithiated $Co_3O_4$, prelithiated $Ni_3O_4$, lithium titanate, lithium niobite, or a combination thereof, wherein x=1 to 2.

The primary particles of anode active material may be in a form of nanoparticle, nanowire, nanofiber, nanotube, nanosheet, nanobelt, nanoribbon, nanodisc, nanoplatelet, or nanohorn having a thickness or diameter from 0.5 nm to 100 nm. In some embodiments, at least one of the primary anode active material particles is coated with a layer of carbon, graphite, or graphene.

In certain embodiments, the composite particulate further comprises from 0.1% to 40% by weight of a lithium ion-conducting additive dispersed in the conducting polymer gel network. The lithium ion-conducting additive may be selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X↑F, Cl, I, or Br, R=a hydrocarbon group, $0<x\leq1$, $1\leq y\leq4$.

The disclosure also provides a powder mass comprising presently invented multi-functional composite particulates and a battery anode comprising this powder mass. These individual particulates in the powder mass are isolated and separated from one another (not chemically bonded together by a binder or by the network of cross-linked polymer chains prior to being incorporated into an anode electrode). These individual particulates may be bonded with a resin binder, along with an optional conductive additive, to make an anode electrode. Also provided is a battery containing the battery anode, which is a lithium-ion battery, lithium metal battery, lithium-sulfur battery, lithium-air battery, or lithium-selenium battery.

The present disclosure also provides a method of producing multi-functional composite particulates comprising a lithium salt and one or multiple anode active material particles embedded in, dispersed in, encapsulated by, or bonded by a polymer electrolyte material for a lithium battery. The method comprises (A) dispersing a plurality of primary particles of an anode active material having a diameter or thickness from 0.5 nm to 20 μm and a lithium salt in an uncured conjugated polymer, reactive monomer, or growing oligomer in a liquid state (e.g. an oxidative initiator, a cross-linking agent, and a monomer in a liquid state) to form a reactive slurry; (B) forming the slurry into micro-droplets and curing the polymer or polymerizing the reactive monomer or growing oligomer to form the multi-functional composite particulates.

The step (B) of micro-droplet formation may be conducted by operating a procedure selected from pan-coating, air-suspension coating, centrifugal extrusion, vibration-nozzle encapsulation, spray-drying, coacervation-phase separation, interfacial polycondensation or interfacial cross-linking, in-situ polymerization, matrix polymerization, extrusion and palletization, or a combination thereof. In certain preferred embodiments, step (B) comprises conducting spray-drying, fluidized bed coating, or air-suspension coating to produce the multi-functional particulates.

In certain embodiments of the disclosure, the method of producing multi-functional particulates of conducting composites for a lithium battery may comprise: (a) dispersing a plurality of primary particles of an anode active material, having a diameter or thickness from 0.5 nm to 20 μm, and a desired amount of a lithium salm into a precursor liquid (precursor to a polymer electrolyte) to form a suspension or slurry; and (b) forming the suspension or slurry into micro-droplets and, concurrently or sequentially, polymerizing and/or crosslinking the precursor to form the multi-functional composite particulates.

The step of forming the suspension into micro-droplets may include operating a procedure selected from pan-coating, air-suspension coating, centrifugal extrusion, vibration-nozzle encapsulation, spray-drying, coacervation-phase separation, interfacial polycondensation or interfacial cross-linking, in-situ polymerization, matrix polymerization, extrusion and palletization, or a combination thereof.

In some embodiments, the precursor liquid may contain a monomer, an initiator or catalyst, a crosslinking agent, an oxidizer and/or dopant. During or after the micro-droplet formation procedure, one may initiate the polymerization and/or crosslinking reactions to produce linear-chain polymer, branched chain polymer, or a cross-linked network of polymer chains in the droplets. In the particulate, the primary particles of anode active material (e.g. Si nanowires or SiO particles) and some optional reinforcement materials and/or additive, are embedded in or encapsulated by the electrolyte polymer chains.

In certain preferred embodiments, anode active material primary particles are porous having surface pores, internal pores, or both surface and internal pores.

The anode active material is preferably in a form of nanoparticle, nanowire, nanofiber, nanotube, nanosheet, nanobelt, nanoribbon, nanodisc, nanoplatelet, or nanohorn having a thickness or diameter from 0.5 nm to 100 nm.

In certain embodiments, the method further comprises a step of incorporating the composite particulates into an anode electrode. The method may also further comprise a step of combining the anode electrode, a cathode electrode, and an electrolyte to form a lithium battery cell.

The present disclosure also provides a powder mass containing the invented composite particulates. In some embodiments, the invented method further comprises a step of making the invented multiple composite particulates into a powder mass as a product. Also provided is a battery anode containing the invented composite particulate described above. The disclosure further provides a battery containing such a battery anode. Thus, the method may further contain a step of incorporating the composite particulates into an anode and a further step of combining the anode, a cathode and electrolyte into a battery cell. The battery may be a lithium-ion battery, lithium metal secondary battery, lithium-sulfur battery, lithium-air battery, or lithium-selenium battery.

In some embodiments, the particles of anode active material contain pre-lithiated particles. In other words, before the electrode active material particles (such as Si or $SnO_2$) are combined with a sacrificial material and embraced by graphene sheets, these particles have been previously intercalated with Li ions (e.g. via electrochemical charging) up to an amount of 0.1% to 30% by weight of Li. Such a pre-lithiating step may be conducted after the porous anode particulates are made.

In some embodiments, the primary particles of anode active material contain particles pre-coated with a coating layer of a conductive material selected from carbon, pitch, carbonized resin, a conductive polymer, a conductive organic material, a metal coating, a metal oxide shell, graphene sheets, or a combination thereof. The coating layer thickness is preferably in the range from 1 nm to 20 µm, preferably from 5 nm to 10 µm, and further preferably from 10 nm to 1 µm.

DETAILED DESCRIPTION OF PREFERRED EMBODIMENTS

A lithium-ion battery cell is typically composed of an anode current collector (e.g. Cu foil), an anode or negative electrode active material layer (i.e. anode layer typically containing particles of an anode active material, conductive additive, and binder), a porous separator and/or an electrolyte component, a cathode or positive electrode active material layer (containing a cathode active material, conductive additive, and resin binder), and a cathode current collector (e.g. Al foil). More specifically, the anode layer is composed of particles of an anode active material (e.g. graphite, Sn, $SnO_2$, or Si), a conductive additive (e.g. carbon black particles), and a resin binder (e.g. SBR or PVDF). This anode layer is typically 50-300 µm thick (more typically 100-200 µm) to give rise to a sufficient amount of current per unit electrode area.

Figure 2A:
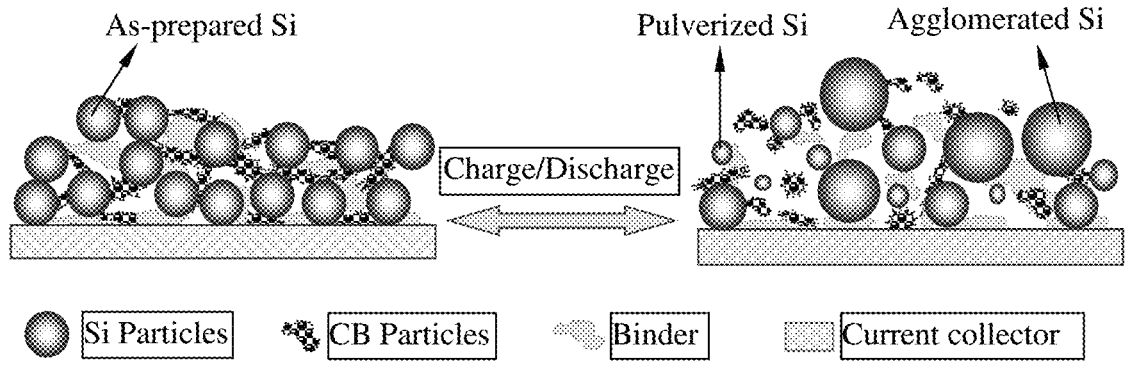
FIG. 2(A) Schematic illustrating the notion that expansion of Si particles, upon lithium intercalation during charging of a prior art lithium-ion battery, can lead to pulverization of Si particles, interruption of the conductive paths formed by the conductive additive, and loss of contact with the current collector.

In order to obtain a higher energy density cell, the anode can be designed to contain higher-capacity anode active materials having a composition formula of $Li_aA$ (A is a metal or semiconductor element, such as Al and Si, and "a"

satisfies 0<a≤5). These materials are of great interest due to their high theoretical capacity, e.g., Li$_4$Si (3,829 mAh/g), Li$_{4.4}$Si (4,200 mAh/g), Li$_{4.4}$Ge (1,623 mAh/g), Li$_{4.4}$Sn (993 mAh/g), Li$_{4.4}$Cd (715 mAh/g), Li$_3$Sb (660 mAh/g), Li$_{4.4}$Pb (569 mAh/g), LiZn (410 mAh/g), and Li$_3$Bi (385 mAh/g). However, as discussed in the Background section, there are several problems associated with the implementation of these high-capacity anode active materials:

1) As schematically illustrated in FIG. 2(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

2) The approach of using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nanoparticles, has failed to overcome the capacity decay problem. Presumably, the protective matrix provides a cushioning effect for particle expansion or shrinkage, and prevents the electrolyte from contacting and reacting with the electrode active material. Unfortunately, when an active material particle, such as Si particle, expands (e.g. up to a volume expansion of 380%) during the battery charge step, the protective coating is easily broken due to the mechanical weakness and/or brittleness of the protective coating materials. There has been no high-strength and high-toughness material available that is itself also lithium ion conductive.

3) The approach of using a core-shell structure (e.g. Si nanoparticle encapsulated in a carbon or SiO$_2$ shell) also has not solved the capacity decay issue. As illustrated in upper portion of FIG. 2(B), a non-lithiated Si particle can be encapsulated by a carbon shell to form a core-shell structure (Si core and carbon or SiO$_2$ shell in this example). As the lithium-ion battery is charged, the anode active material (carbon- or SiO$_2$-encapsulated Si particle) is intercalated with lithium ions and, hence, the Si particle expands. Due to the brittleness of the encapsulating shell (carbon), the shell is broken into segments, exposing the underlying Si to electrolyte and subjecting the Si to undesirable reactions with electrolyte during repeated charges/discharges of the battery. These reactions continue to consume the electrolyte and reduce the cell's ability to store lithium ions.

Figure 2B:
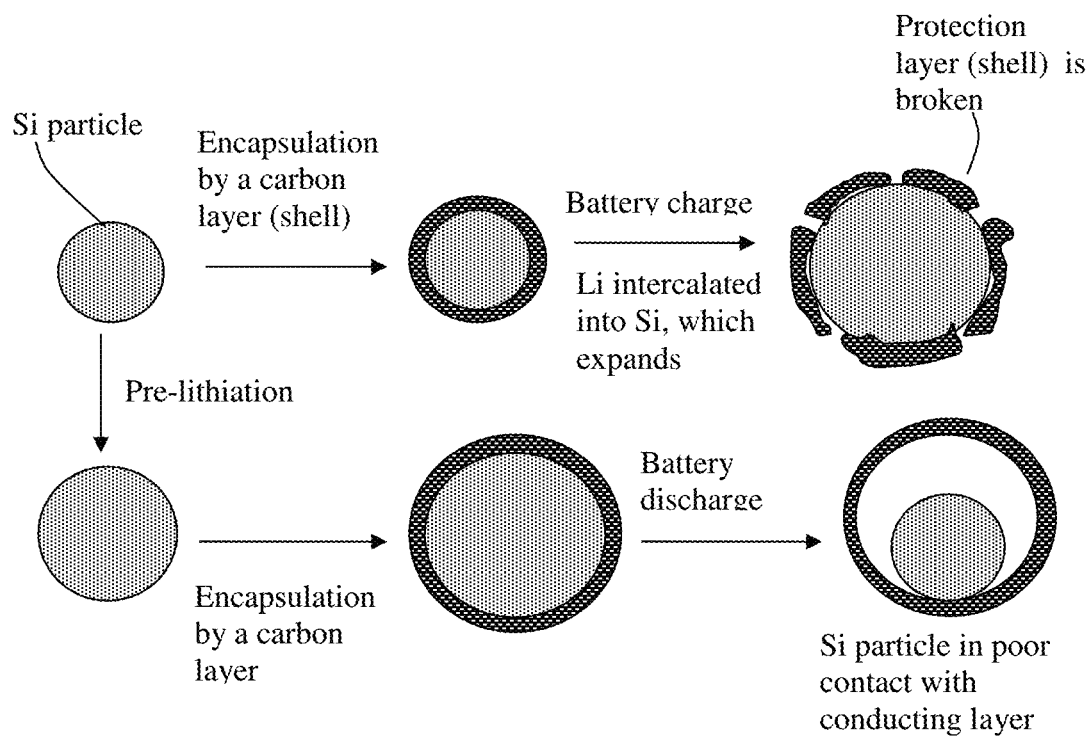
FIG. 2(B) illustrates the issues associated with prior art anode active material; for instance, a non-lithiated Si particle encapsulated by a protective shell (e.g. carbon shell) in a core-shell structure inevitably leads to breakage of the shell and that a pre-lithiated Si particle encapsulated with a protective layer leads to poor contact between the contracted Si particle and the rigid protective shell during battery discharge.

4) Referring to the lower portion of FIG. 2(B), wherein the Si particle has been pre-lithiated with lithium ions; i.e. has been pre-expanded in volume. When a layer of carbon (as an example of a protective material) is encapsulated around the pre-lithiated Si particle, another core-shell structure is formed. However, when the battery is discharged and lithium ions are released (de-intercalated) from the Si particle, the Si particle contracts, leaving behind a large gap between the protective shell and the Si particle. Such a configuration is not conducive to lithium intercalation of the Si particle during the subsequent battery charge cycle due to the gap and the poor contact of Si particle with the protective shell (through which lithium ions can diffuse). This would significantly curtail the lithium storage capacity of the Si particle particularly under high charge rate conditions.

In other words, there are several conflicting factors that must be considered concurrently when it comes to the design and selection of an anode active material in terms of material type, shape, size, porosity, and electrode layer thickness. Thus far, there has been no effective solution offered by any prior art teaching to these conflicting problems. We have solved these challenging issues that have troubled battery designers and electrochemists alike for more than 30 years by developing the multi-functional composite particulates comprising anode active material particles (e.g. Si and SiO$_x$ particles, 0<x≤2.0) and a lithium salt dispersed in a polymer electrolyte matrix.

The disclosure provides an anode particulate or multiple anode particulates (herein referred to as multi-functional composite particulates) for a lithium battery and a process or method for producing such particulates. The composite particulate has a diameter from 100 nm to 50 μm and comprises a polymer electrolyte matrix comprising a lithium salt dissolved or dispersed in the polymer electrolyte matrix and one or a plurality of primary particles of an anode active material that are encapsulated by, embedded in, dispersed in, or bonded by the polymer electrolyte having a lithium ion conductivity from $10^{-8}$ to $5\times10^{-2}$ S/cm, wherein the primary particles have a diameter or thickness from 0.5 nm to 20 μm and occupy a weight fraction from 5% to 98% based on the total weight of the composite particulate. The lithium salt is preferably in the amount from 1% to 30% by weight of the composite particulate. The multi-functional particulate may have a diameter preferably and typically from 500 nm to 50 μm, and more preferably and typically from 1 μm to 30 μm.

The polymer electrolyte in the composite particulate preferably comprises a polymer selected from poly(ethylene oxide) (PEO), polypropylene oxide (PPO), poly(ethylene glycol) (PEG), poly(acrylonitrile) (PAN), poly(methyl methacrylate) (PMMA), poly(vinylidene fluoride) (PVdF), poly bis-methoxy ethoxyethoxide-phosphazenex, polyvinyl chloride, polydimethylsiloxane, poly(vinylidene fluoride)-hexafluoropropylene (PVDF-HFP), cyanoethyl poly(vinyl alcohol) (PVACN), a pentaerythritol tetraacrylate (PETEA)-based polymer, an aliphatic polycarbonate (including poly(vinylene carbonate) (PVC), poly(ethylene carbonate) (PEC), poly(propylene carbonate) (PPC), and poly(trimethylene carbonate) (PTMC)), a single Li-ion conducting solid polymer electrolyte with a carboxylate anion, a sulfonylimide anion, or sulfonate anion, a crosslinked electrolyte of poly(ethylene glycol)diacrylate (PEGDA) or poly(ethylene glycol)methyl ether acrylate, a sulfonated derivative thereof, or a combination thereof. The polymers in the above list are commonly used as an ingredient in a gel polymer electrolyte or a solid polymer electrolyte of a lithium-ion battery cell. These polymers, however, have not been previously used in a composite particulate as herein defined.

The lithium salt dispersed or dissolved in the polymer electrolyte is preferably selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-methanesulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium nitrate (LiNO$_3$), Li-fluoroalkyl-phosphate (LiPF$_3$(CF$_2$CF$_3$)$_3$), lithium bisperfluoro-ethylsulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

The composite particulate is preferably further encapsulated by a shell of conducting material selected from a graphene, carbon (e.g. carbon nanoparticles, carbon black, acetylene black, carbon nanotube, carbon nano-fiber, etc.), graphite (e.g. expanded graphene flakes, exfoliated graphite worms, nano-scaled or sub-micron-scaled graphite particles), conducting polymer, metal, composite, or a combination thereof. Preferably, the shell has an electrical conductivity from $10^{-8}$ S/cm to $10^3$ S/cm, more preferably from $10^{-5}$ S/cm to $10^2$ S/cm and further preferably at least $10^{-2}$ S/cm. The composite shell includes a polymer matrix composite (e.g. rubbery or elastomeric matrix, thermoplastic matrix, thermoset matrix, interpenetrating network matrix, etc.), metal matrix composite (e.g. Al, Zn, etc.), ceramic matrix composite (e.g. metal oxide and metal sulfide matrix), glass matrix composite, carbon matrix composite (e.g. amorphous carbon, CVD carbon, PVD carbon, sputtering carbon, polymeric carbon, etc.), and organic matrix composite.

In some embodiments, the composite further comprises graphene sheets selected from pristine graphene, graphene fluoride, graphene chloride, graphene bromide, graphene iodide, nitrogenated graphene, hydrogenated graphene, doped graphene, chemically functionalized graphene, a combination thereof, or a combination thereof with graphene oxide or reduced graphene oxide. Typically, these graphene sheets, along with the primary anode active material particles, are dispersed in the matrix of electrically and ionically conducting networks of cross-linked polymer chains. These graphene sheets may be located in the encapsulating shell to embrace the composite droplets and/or be part of the droplets.

In some embodiments, the polymer electrolyte matrix further comprises a reinforcement material or additive selected from carbon nanotubes, carbon nano-fibers, carbon or graphite fibers, graphene sheets, expanded graphite flakes, polymer fibrils, glass fibers, ceramic fibers, metal filaments or metal nano-wires, whiskers, carbon black, acetylene black, needle coke, carbon particles, graphite particles, or a combination thereof. The preferred amount of the reinforcement material or additive is from 1% to 30% by weight based on the total composite particulate weight. Electrically conductive reinforcements are preferred.

The anode active material may be in a form of minute solid or porous particles (primary anode material particles) having a diameter or thickness preferably from 0.5 nm to 2 μm (further preferably from 1 nm to 100 nm). One or a plurality of primary particles are embedded in, encapsulated by, or bonded by an electrolyte polymer to form a micro-droplet. This micro-droplet is may be further encapsulated or embraced by a shell of a conducting material.

Preferably, the anode active material is a high-capacity anode active material having a specific lithium storage capacity greater than 372 mAh/g, which is the theoretical capacity of lithium storage in graphite.

Figure 3:
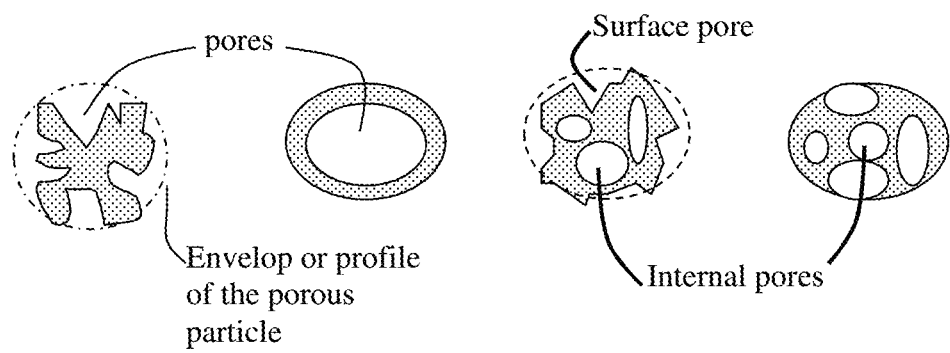
FIG. 3 Some examples of porous primary particles of an anode active material.

The primary particles themselves may be porous having porosity in the form of surface pores and/or internal pores. FIG. 3 shows some examples of porous primary particles of an anode active material. These pores of the primary particles allow the particle to expand into the free space without a significant overall volume increase of the particulate and without inducing any significant volume expansion of the entire anode electrode.

This amount of pore volume inside the particulate (surface or internal pores of porous primary anode particles) provides empty space to accommodate the volume expansion of the anode active material so that the thin encapsulating layer would not significantly expand (not to exceed 50% volume expansion of the particulate) when the lithium battery is charged. Preferably, the particulate does not increase its volume by more than 20%, further preferably less than 10% and most preferably by approximately 0% when the lithium battery is charged. Such a constrained volume expansion of the particulate would not only reduce or eliminate the volume expansion of the anode electrode but also reduce or eliminate the issue of repeated formation and destruction of a solid-electrolyte interface (SEI) phase. We have discovered that this strategy surprisingly results in significantly reduced battery capacity decay rate and dramatically increased charge/discharge cycle numbers. These results are unexpected and highly significant with great utility value.

Figure 7:
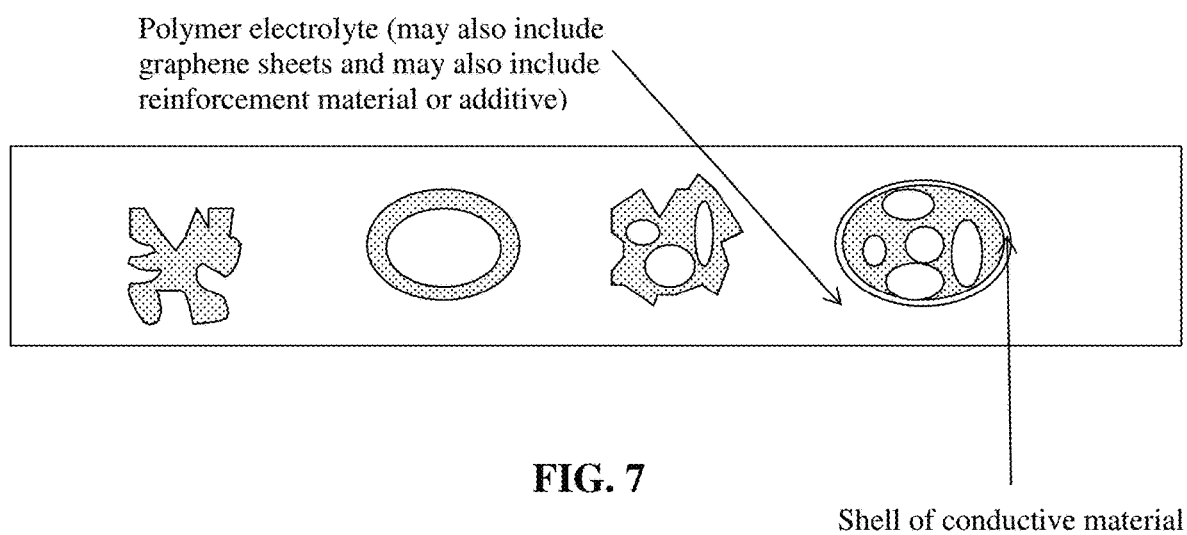
FIG. 7 Examples of porous primary particles of anode active material (with one having an optional shell of conductive material) and all the particles encapsulated by, embedded in, dispersed in, or bonded by a polymer electrolyte that may also include graphene sheets and may also include reinforcement material or additive.

FIG. 7 shows examples of porous primary particles of anode active material (with one having an optional shell of conductive material) and all the particles encapsulated by, embedded in, dispersed in, or bonded by a polymer electrolyte that may also include graphene sheets and may also include reinforcement material or additive.

Figure 1:
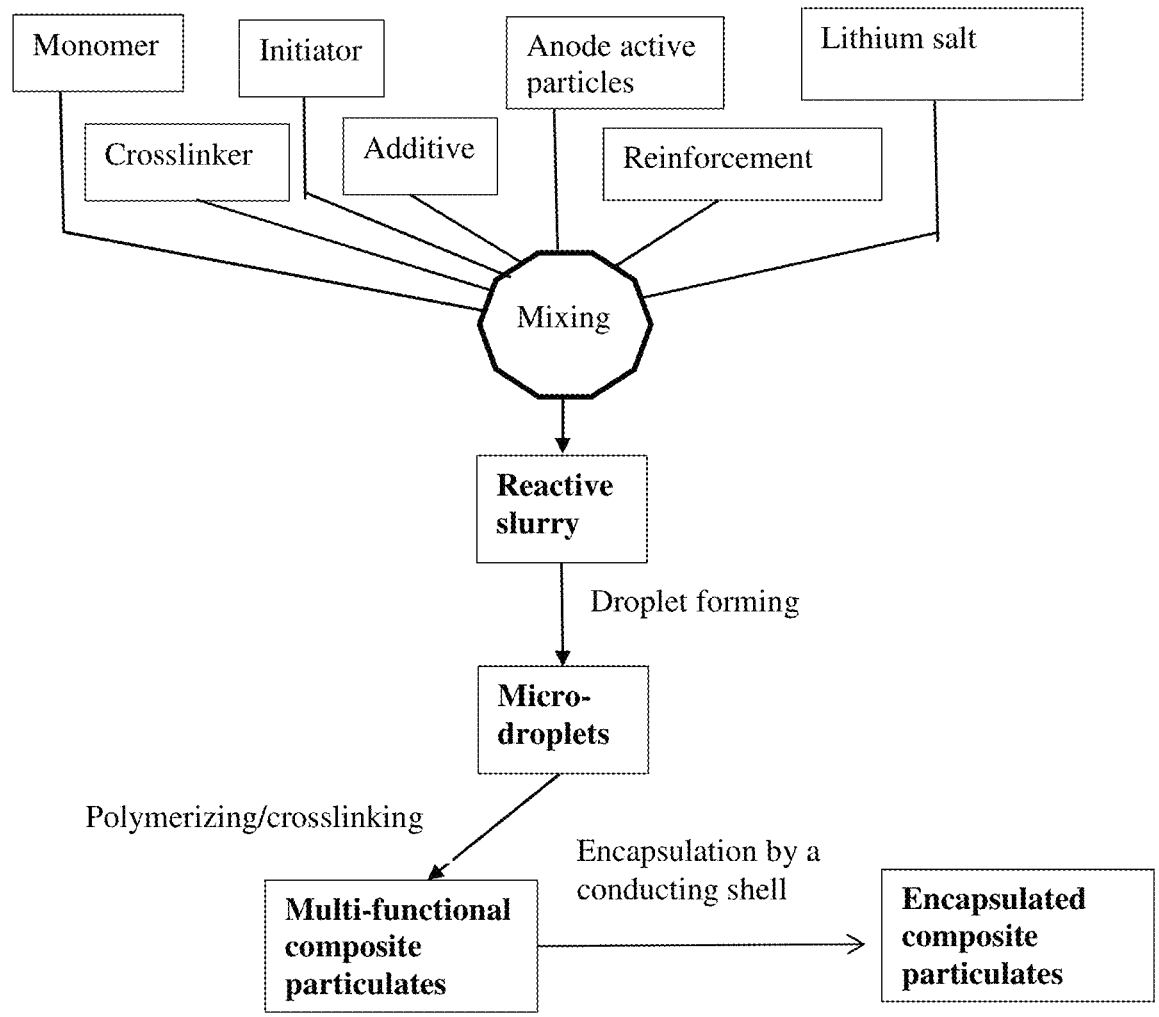
FIG. 1 A flow chart showing the process for producing multi-functional composite particulates.

The present disclosure also provides a method of producing multi-functional composite particulates comprising anode active material particles embedded in, dispersed in, encapsulated by, or bonded by an electrolyte polymer and a lithium salt dissolved/dispersed in this electrolyte polymer for a lithium battery. As schematically illustrated in FIG. 1, the method comprises mixing reactants (monomer, initiator, and optional curing or crosslinking agent), primary particles of an anode active material, optional reinforcement material, and optional lithium ion-conducting additive to form a reactive slurry. One may mix these ingredients sequentially or concurrently. For instance, one may mix all of these ingredients to form the reactive slurry in one pot (one container) all at once and then rapidly form the reactive slurry into micro-droplets, allowing the reactants to react with one another for polymerizing and crosslinking to form the conductive networks of crosslinked polymer chains. The anode active material particles are dispersed in, embedded in, bonded by, or encapsulated by the electrolyte polymer.

Alternatively, one may first mix certain ingredient(s) in one pot and other ingredients in other pot(s) and then combine them together in one pot. For instance, one may mix the monomer and the initiator in one pot, allowing the mixture to proceed to form a reactive oligomer (low molecular weight chains). A separate pot may be used to contain the curing agent (crosslinker). The primary particles of anode active material and other ingredients may be dispersed into either pot or both pots. The ingredients in two pots are then combined together and then heated or radiation-exposed to initiate the polymerization and crosslinking reactions (if appropriate).

In some embodiments, the method comprises (A) dispersing a lithium salt and a plurality of primary particles of an anode active material having a diameter or thickness from 0.5 nm to 20 μm in an uncured polymer, reactive monomer, or growing oligomer in a liquid state (e.g. an initiator, a cross-linking agent, and a monomer in a liquid state) to form a reactive slurry; (B) forming the slurry into micro-droplets and curing the polymer or polymerizing and cross-linking the reactive monomer or growing oligomer to form the multi-functional composite particulates.

In certain embodiments, the multiple micro-droplets of electrolyte polymer-embedded anode active material particles are produced by operating a procedure selected from pan-coating, air-suspension coating, centrifugal extrusion, vibration-nozzle encapsulation, spray-drying, coacervation-phase separation, interfacial polycondensation and interfacial cross-linking, in-situ polymerization, matrix polymerization, extrusion and pelletizing, or a combination thereof.

The micro-droplets of electrolyte polymer-encapsulated anode active material particles can contain those anode active materials capable of storing lithium ions greater than 372 mAh/g, theoretical capacity of natural graphite. Examples of these high-capacity anode active materials are Si, Ge, Sn, $SnO_2$, $SiO_x$, $Co_3O_4$, etc. As discussed earlier, these materials, if implemented in the anode, have the tendency to expand and contract when the battery is charged and discharged. At the electrode level, the expansion and contraction of the anode active material can lead to expansion and contraction of the anode, causing mechanical instability of the battery cell. At the anode active material level, repeated expansion/contraction of particles of Si, Ge, Sn, $SiO_x$, $SnO_2$, $Co_3O_4$, etc. quickly leads to pulverization of these particles and rapid capacity decay of the electrode.

The primary anode active material particles are preferably porous, having surface pores or internal pores, as schematically illustrated in FIG. 3. The production methods of porous solid particles are well-known in the art. For instance, the production of porous Si particles may be accomplished by etching particles of a Si—Al alloy using HCl solution (to remove the Al element leaving behind pores) or by etching particles of a Si—$SiO_2$ mixture using HF solution (by removing $SiO_2$ to create pores).

Porous $SnO_2$ nanoparticles may be synthesized by a modified procedure described by Gurunathan et al [P. Gurunathan, P. M. Ette and K. Ramesha, *ACS Appl. Mater. Inter.*, 6 (2014) 16556-16564]. In a typical synthesis procedure, 8.00 g of $SnCl_2.6H_2O$, 5.20 g of resorcinol and 16.0 mL of 37% formaldehyde solution were mixed in 160 mL of $H_2O$ for about 30 minutes. Subsequently, the solution is sealed in a 250 mL round-bottom flask and kept in water bath at 80° C. for 4 hours. The resulting red gel is dried at 80° C. in an oven and calcined at 700° C. for 4 hours in $N_2$ and air atmosphere in sequence. Finally, the obtained white $SnO_2$ may be mechanically ground into finer powder for 30-60 minutes in mortar.

All types of porous anode active material particles may be produced by depositing the anode active material onto surfaces or into pores of a sacrificial material structure, followed by removing the sacrificial material. Such a deposition can be conducted using CVD, plasma-enhanced CVD, physical vapor deposition, sputtering, solution deposition, melt impregnation, chemical reaction deposition, etc.

Additionally, for the purpose of addressing the rapid battery capacity decay problems, the primary particles of anode active material may contain pre-lithiated particles. In other words, before the electrode active material particles (such as Si, Ge, Sn, $SnO_2$, $Co_3O_4$, etc.) are embedded in a sacrificial material matrix and then embraced by graphene sheets, these particles have already been previously intercalated with Li ions (e.g. via electrochemical charging).

In some embodiments, the primary particles of anode electrode active material (embedded in an electrolyte polymer) contain particles that are pre-coated with a coating of a conductive material selected from carbon, pitch, carbonized resin, a conductive polymer, a conductive organic material, a graphene coating (e.g. graphene sheets), a metal coating, a metal oxide shell, or a combination thereof. The coating layer thickness is preferably in the range from 1 nm to 10 μm, preferably from 2 nm to 1 μm, and further preferably from 5 nm to 100 nm. This coating is implemented for the purpose of establishing a stable solid-electrolyte interface (SEI) to increase the useful cycle life of a lithium-ion battery. Coating of graphene sheets on anode active material particles may be accomplished by using ball milling of solid droplets and graphite or graphene powder together.

The multi-functional composite particulates of graphene-encapsulated electrolyte polymer-embedded anode particles may be exposed to a matrix or binder material (e.g. a conducting polymer) that chemically bonds the external graphene sheets together or simply fills the gaps between graphene sheets. The matrix/binder material helps to completely seal off the embracing graphene sheets to prevent direct contact of the embraced anode active material with liquid electrolyte, which otherwise can continue to form additional SEI via continuously consuming the lithium ions or solvent in the electrolyte, leading to rapid capacity decay.

The primary particles of anode active material may be selected from the group consisting of: (A) lithiated and un-lithiated silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (B) lithiated and un-lithiated alloys or intermetallic compounds of Si, Ge, Sn, Pb, Sb, Bi, Zn, Al, Ti, Ni, Co, or Cd with other elements; (C) lithiated and un-lithiated oxides, carbides, nitrides, sulfides, phosphides, selenides, and tellurides of Si, Ge, Sn, Pb, Sb, Bi, Zn, Al, Ti, Fe, Ni, Co, or Cd, and their mixtures, composites, or lithium-containing composites; (D) lithiated and un-lithiated salts and hydroxides of Sn; (E) lithium titanate, lithium manganate, lithium aluminate, lithium-containing titanium oxide, lithium transition metal oxide; and combinations thereof.

Several micro-encapsulation processes require the polymer to be dissolvable in a solvent or its precursor (or monomer or oligomer) initially contains a liquid state (flowable). Fortunately, all the polymers or their precursors used herein are soluble in some common solvents or the monomer or other polymerizing/curing ingredients are in a liquid state to begin with.

There are three broad categories of micro-encapsulation methods that can be implemented to produce electrolyte polymer-embedded or encapsulated anode particles (the micro-droplets): physical methods, physico-chemical methods, and chemical methods. The physical methods include pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization. In all of these methods, polymerization and/or crosslinking may be allowed to proceed during and/or after the micro-droplet formation procedure.

Pan-coating method: The pan coating process involves tumbling the anode active material primary particles in a pan or a similar device while the matrix material (e.g. monomer/oligomer liquid or uncured polymer/solvent solution; possibly containing a lithium salt dispersed or dissolved therein) is applied slowly until a desired amount of matrix is attained.

Air-suspension coating method: In the air suspension coating process, the solid primary particles of anode active material are dispersed into the supporting air stream in an encapsulating chamber. A controlled stream of a reactive precursor solution (e.g. polymer or its monomer or oligomer dissolved in a solvent; or its monomer or oligomer alone in a liquid state) is concurrently introduced into this chamber, allowing the solution to hit and coat/embed the suspended particles. These suspended particles are encapsulated by or embedded in the reactive precursor (monomer, oligomer, etc. which is polymerized/cured concurrently or subsequently) while the volatile solvent is removed, leaving behind a composite comprising a matrix of conducting network polymer and anode active material particles. This process may be repeated several times until the required parameters, such as full-encapsulation, are achieved. The air stream which supports the anode particles also helps to dry them, and the rate of drying is directly proportional to the temperature of the air stream, which can be adjusted for optimized polymer network amount.

In a preferred mode, the particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating matrix amount is achieved.

Centrifugal extrusion: Primary anode particles may be embedded in a polymer network or precursor material using a rotating extrusion head containing concentric nozzles. In this process, a stream of core fluid (slurry containing anode particles dispersed in a solvent) is surrounded by a sheath of shell solution or melt containing the polymer or precursor. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational nozzle encapsulation method: matrix-encapsulation of anode particles can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the anode active material particles and the polymer or precursor.

Spray-drying: Spray drying may be used to encapsulate anode particles when the particles are suspended in a melt or polymer/precursor solution to form a suspension. In spray drying, the liquid feed (solution or suspension) is atomized to form droplets which, upon contacts with hot gas, allow solvent to get vaporized and thin polymer shell or matrix to fully embrace the particles.

Coacervation-phase separation: This process consists of three steps carried out under continuous agitation:
(a) Formation of three immiscible chemical phases: liquid manufacturing vehicle phase, core material phase and encapsulation material phase. The anode primary particles are dispersed in a solution of the encapsulating polymer or precursor. The encapsulating material phase, which is an immiscible polymer in liquid state, is formed by (i) changing temperature in polymer solution, (ii) addition of salt, (iii) addition of non-solvent, or (iv) addition of an incompatible polymer in the polymer solution.
(b) Deposition of encapsulation material: anode particles being dispersed in the encapsulating polymer solution, encapsulating polymer/precursor coated around anode particles, and deposition of liquid polymer embracing around anode particles by polymer adsorbed at the interface formed between core material and vehicle phase; and
(c) Hardening of encapsulating shell material: shell material being immiscible in vehicle phase and made rigid via thermal, cross-linking, or dissolution techniques.

Interfacial polycondensation and interfacial cross-linking: Interfacial polycondensation entails introducing the two reactants to meet at the interface where they react with each other. This is based on the concept of the Schotten-Baumann reaction between an acid chloride and a compound containing an active hydrogen atom (such as an amine or alcohol), polyester, polyurea, polyurethane, or urea-urethane condensation. Under proper conditions, thin flexible encapsulating shell (wall) forms rapidly at the interface. A suspension of the anode particles and a diacid chloride are emulsified in water and an aqueous solution containing an amine and a polyfunctional isocyanate is added. A base may be added to neutralize the acid formed during the reaction. Condensed polymer shells form instantaneously at the interface of the emulsion droplets. Interfacial cross-linking is derived from interfacial polycondensation, wherein cross-linking occurs between growing polymer chains and a multi-functional chemical groups to form a polymer shell material.

In-situ polymerization: In some micro-encapsulation processes, anode particles are fully embedded in a monomer or oligomer first. Then, direct polymerization of the monomer or oligomer is carried out with the presence of these material particles dispersed therein.

Matrix polymerization: This method involves dispersing and embedding anode primary particles in a polymeric matrix during formation of the particles. This can be accomplished via spray-drying, in which the particles are formed by evaporation of the solvent from the matrix material. Another possible route is the notion that the solidification of the matrix is caused by a chemical change.

In summary, in certain embodiments, the disclosure provides a method of producing the multi-functional particulates, the method comprising (A) dispersing a plurality of primary particles of an anode active material, having a diameter or thickness from 0.5 nm to 20 µm, in a liquid mixture of a monomer or oligomer for a conjugated polymer, an initiator, and a cross-linking agent to form a reactive slurry; (B) forming the reactive slurry into micro-droplets and polymerizing and curing the monomer or oligomer in the micro-droplets to form the multi-functional particulates. The reactive mixture may further comprise a dopant, a reinforcement material, a lithium ion-conducting additive, an electron-conducting additive, or a combination thereof.

In some embodiments, the reactive slurry further comprises a high-strength material selected from carbon nanotubes, carbon nano-fibers, carbon or graphite fibers, graphene sheets, expanded graphite flakes, polymer fibrils, glass fibers, ceramic fibers, metal filaments or metal nanowires, or a combination thereof. Some of these high-strength materials are electron-conducting.

The step (B) of forming micro-droplets may comprise a procedure selected from pan-coating, air-suspension coating, centrifugal extrusion, vibration-nozzle encapsulation, spray-drying, coacervation-phase separation, interfacial polycondensation or interfacial cross-linking, in-situ polymerization, matrix polymerization, extrusion and palletization, or a combination thereof.

In certain embodiments, the micro-droplets contain water or a liquid solvent and the method further comprises a step of removing water or solvent.

The following examples serve to provide the best modes of practice for the present disclosure and should not be construed as limiting the scope of the disclosure:

EXAMPLE 1

Production of Pentaerythritol Tetraacrylate (PETEA)-Based Electrolyte Polymer-Embedded Anode Particulates Several types of anode active materials in a fine powder form were investigated. These include $Co_3O_4$, Si, Ge, $SiO_x$ (0<x<2), etc., which are used as examples to illustrate the best mode of practice. These active materials were either prepared in house or purchased from commercial sources.

A pentaerythritol tetraacrylate (PETEA)-based electrolyte polymer was prepared by gelation of a precursor solution. The precursor solution comprised 1.5 wt % PETEA ($C_{17}H_{20}O_8$) as a monomer and 0.1 wt % azobisdiisobutyronitrile (AIBN, $C_8H_{12}N_4$) as an initiator dissolved in a liquid electrolyte containing 1M bis(trifluoromethane) sulfonamide lithium (LiTFSI) salt in a mixture of 1,2-dioxolane (DOL)/dimethoxymethane (DME) (1:1 by volume) with 1 wt % $LiNO_3$ additive. A powder mass of anode active material particles and the precursor solution was combined to form micro-droplets via pan-coating. The precursor solution in the micro-droplets was polymerized at 70° C. for half an hour to obtain composite particulates.

The radical polymerization of PETEA was thermally initiated by azobisisobutyronitrile (AIBN). The polymerization reaction occurs in liquid electrolyte. The primary radicals derived via the thermal decomposition of AIBN attack the C=C double bond of the PETEA monomer to create four free radicals on the monomer since PETEA possesses four C=C double bonds to be initiated, followed by the chain growth reaction by sequentially adding PETEA monomers to the active sites (i.e., four free radical ends) of initiated monomer. Finally, a three-dimensional network-like polymerized PETEA is formed in liquid electrolyte.

EXAMPLE 2

Anode Particulates Containing Sn, $SiO_x$, $SnO_2$, and Ge Primary Particles and Si Nanowires Embedded in Cyanoethyl Poly(Vinyl Alcohol) (PVA-CN)

The procedures for producing electrolyte polymer-protected composite particulates were similar to those in Example 1. Cyanoethyl poly(vinyl alcohol) polymer was prepared by gelation of a precursor solution containing 2 wt. % PVA-CN dissolved in a liquid electrolyte that contained 1M $LiPF_6$ in a mixture solution of ethylene carbonate (EC)/dimethyl carbonate (DMC)/ethylmethyl carbonate (EMC) with a volume ratio of 1:1:1. The Si nanowires, Sn, $SiO_x$, $SnO_2$, and Ge primary particles were separately combined with a reacting precursor solution to form reactive micro-droplets using pan-coating. These micro-droplets contained anode active material primary particles embedded in a reactive mass. The precursor solution was heated at a temperature of 70° C. to obtain black PVA-CN based polymer.

In a separate experiment, carbon-coated Si nanowires (available from Angstron Energy Co., AEC, Dayton, Ohio) were subjected to electrochemical pre-lithiation to prepare several samples containing from 5% to 54% Li. Pre-lithiation of an electrode active material means the material is intercalated or loaded with lithium before a battery anode or cell is made.

In yet another experiment, porous Si particles were prepared by using HCl to etch out Al in a Si—Al alloy (80% Al alloyed with 20% Si). Etching and leaching out Al produces pores inside Si particles and on Si particle surfaces. These porous Si particles were then used in the preparation of the multi-functional composite particulates.

EXAMPLE 3

Production of Poly(Vinyl Carbonate)-Protected Anode Particles ($SnO_2$ and $SiO_x$)

Liquid vinylene carbonate (VC), in the presence of a lithium salt, can be polymerized into poly(vinyl carbonate) (PVCA) catalyzed by a thermally initialized radical initiator. The lithium salt, lithium difluoro(oxalate) borate (LiDFOB) has the combined chemical structures of lithium bis(oxalate) borate and lithium tetrafluoroborate ($LiBF_4$). In an experiment, 1.43 g LiDFOB was dissolved in to 10 mL VC to obtain a homogeneous and transparent solution (1.0 m LiDFOB in VC, ≈9.6% (w/w)) and then the solution was added with 10 mg AIBN. A desired amount of anode active particles was then combined with this solution using a pan-coating procedure to produce reactive micro-droplets. The droplets were maintained at 60° C. for 24 h and 80° C. for 10 h in a vacuum oven to complete polymerization of VC.

The resulting multi-functional composite particulates (PVCA-embedded anode particles), along with a SBR binder, and Super-P conductive additive were then made into an anode electrode.

EXAMPLES 4

Crosslinked Polymer Electrolyte (LiBAMB-PETMP Single Ion-Conducting Polymer Electrolyte)-Embedded Anode Particles The experiment began with the synthesis of lithium bis(allylmalonato)borate (LiBAMB). In a representative procedure, allylmalonic acid (60 mmol), lithium carbonate (15 mmol) and boric acid (30 mmol) were added in 150 mL dry acetonitrile to form a solution. The solution was heated under nitrogen gas flow in an oil bath at 80° C. for 12 h. After cooling down, the solution mass was filtered and the solvent was removed under reduced pressure. A white solid was obtained after drying in a vacuum oven at 60° C. for 48 h.

Subsequently, the LiBAMB-PETMP single lithium ion-conducting polymer electrolyte was synthesized from pentaerythritol tetrakis(2-mercaptoacetate) (PETMP) and LiBAMA. In an argon filled glove box, LiBAMB (2.5 mmol), PETMP (1.25 mmol) and 2,2-dimethoxy-2-phenylacetophenone (DMPA, 0.25 mmol) were dissolved in 5 mL gamma-butyrolactone (GBL) to form a reactive solution. A desired amount of Si nanoparticles (as an example of an anode active material) and some conducting fillers (CNTs, graphene sheets, carbon black, etc.) were dispersed in the reactive solution to form a reactive slurry, which was quickly spray-dried to form reactive micro-droplets. The micro-droplets were then exposed to UV light (365 nm) for 30-60 min to form the desired composite particulates.

EXAMPLE 5

Preparation of Another Single Ion-Conducting Polymer as a Matrix for Anode Particulates Another single-ion conducting polymer electrolyte (SIPE) with a high lithium-ion transference number, good mechanical strength, and excellent ionic conductivity was synthesized by coupling of lithium bis(allylmalonato) borate (LiBAMB), pentaerythritol tetrakis (2-mercaptoacetate) (PETMP) and 3,6-dioxa-1,8-octanedithiol (DODT) in a the presence of anode active material particles via a one-step photo-initiated in situ thiol-ene click reaction. The structure-optimized LiBAMB-PETMP-DODT material shows an outstanding ionic conductivity of $1.32 \times 10^{-3}$ S/cm at 25° C., together with a high lithium-ion transference number of 0.92 and wide electrochemical window up to 6.0 V.

The SIPE-encapsulated anode particles were prepared by a method that included immersing anode particles into the precursor solution, consisting of LiBAMB, PETMP, and DODT. After thorough mixing, the curing agent (DMTA) was added into the precursor solution and the resulting slurry was spray-dried to form reactive micro-droplets. Then, the procedure further included exposing the micro-droplets to ultraviolet (UV) light (365 nm). Photo-initiated in situ thiol-ene click reaction took place immediately and was completed in less than 5 minutes.

Several samples of electrolyte polymer-embedded anode particulates were mixed with reduced graphene powder particles in a ball-milling chamber containing $ZrO_2$ beads as milling balls. The high-intensity ball mill was operated for 20-60 minutes to obtain graphene-encapsulated, solid electrolyte polymer-embedded composite particulates.

EXAMPLE 6

Preparation and Electrochemical Testing of Various Battery Cells

For most of the anode and cathode active materials investigated, we prepared lithium-ion cells or lithium metal cells using the conventional slurry coating method. A typical anode composition includes 85 wt. % active material (e.g., multi-functional particulates containing Si or $Co_3O_4$ particles dispersed in a matrix of networks of crosslinked conducting chains), 7 wt. % acetylene black (Super-P), and 8 wt. % polyvinylidene fluoride binder (PVDF, 5 wt. % solid content) dissolved in N-methyl-2-pyrrolidinoe (NMP). After coating the slurries on Cu foil, the electrodes were dried at 120° C. in vacuum for 2 h to remove the solvent. Cathode layers are made in a similar manner (using Al foil as the cathode current collector) using the conventional slurry coating and drying procedures. An anode layer, separator layer (e.g. Celgard 2400 membrane), and a cathode layer are then laminated together and housed in a plastic-Al envelop. The cell is then injected with 1 M $LiPF_6$ electrolyte solution dissolved in a mixture of ethylene carbonate (EC) and diethyl carbonate (DEC) (EC-DEC, 1:1 v/v). In some cells, ionic liquids were used as the liquid electrolyte. The cell assemblies were made in an argon-filled glove-box.

The cyclic voltammetry (CV) measurements were carried out using an Arbin electrochemical workstation at a typical scanning rate of 1 mV/s. In addition, the electrochemical performances of various cells were also evaluated by galvanostatic charge/discharge cycling at a current density of from 50 mA/g to 10 A/g. For long-term cycling tests, multi-channel battery testers manufactured by LAND were used.

Figure 4:
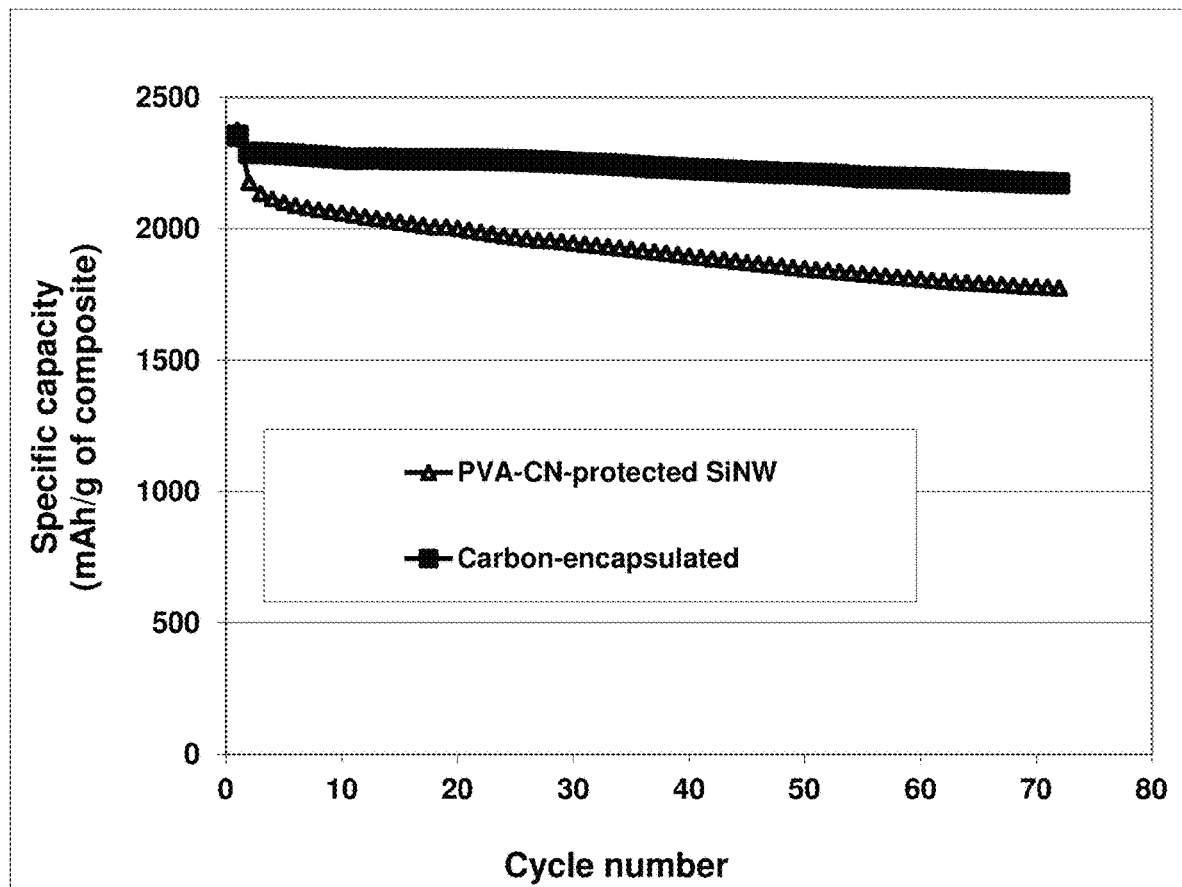
FIG. 4 The cycling behaviors of two lithium-ion cells: one featuring an anode electrode containing composite particulates of electrolyte polymer and Si nanowires, dispersed in electrolyte polymer, as the anode active material and the other containing amorphous carbon-encapsulated Si nanowires as the anode active material.

FIG. 4 shows the cycling behaviors of two lithium-ion cells: one featuring an anode electrode containing composite particulates of electrolyte polymer and Si nanowires as the anode active material and the other containing amorphous carbon-encapsulated Si nanowires as the anode active material. The former cell exhibits significantly more stable charge/discharge cycles.

Figure 5:
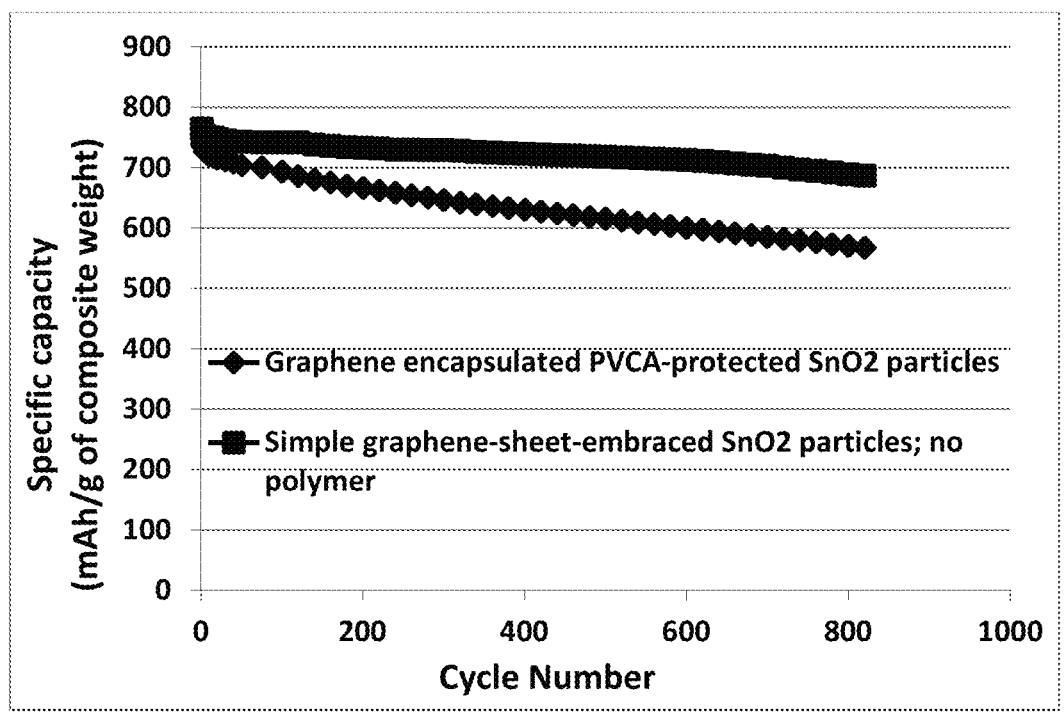
FIG. 5 The cycling behaviors of two lithium-ion cells: one featuring an anode containing graphene-encapsulated composite particulates comprising $SnO_2$ nanoparticles dispersed in PVCA-based electrolyte polymer matrix and the other containing graphene sheet-wrapped $SnO_2$ nanoparticles as the anode active material.

FIG. 5 shows the cycling behaviors of two lithium-ion cells: one featuring an anode containing $SnO_2$ nanoparticles dispersed in a PVCA-based electrolyte polymer matrix and the other containing graphene sheet-wrapped $SnO_2$ nanoparticles as the anode active material (no polymer electrolyte protection). Again, the invented electrolyte polymer led to a more stable cycling behavior.

Figure 6:
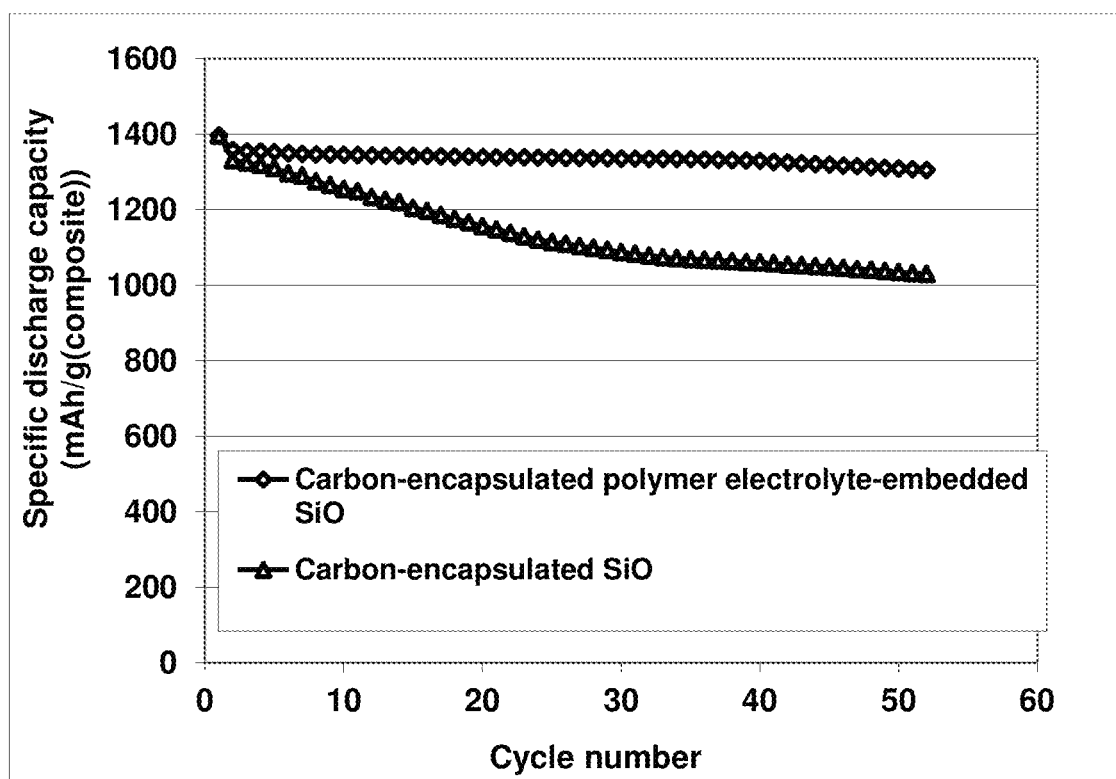
FIG. 6 The cycling behaviors of two lithium-ion cells: one featuring an anode containing composite particulates comprising SiO nanoparticles dispersed in CNT-reinforced LiBAMB-PETMP-DODT-based electrolyte polymer matrix and the other containing graphene sheet-wrapped CNT-reinforced SiO nanoparticles as the anode active material.

Shown in FIG. 6 are the cycling behaviors of two lithium-ion cells: one featuring an anode containing composite particulates comprising SiO nanoparticles dispersed in CNT-reinforced LiBAMB-PETMP-DODT-based electrolyte polymer matrix and the other containing carbon-wrapped CNT-SiO nanoparticles as the anode active material. It appears that the polymer electrolyte protection has significantly reduced the tendency for the anode active material particles to undergo repeated destruction and re-formation of solid-electrolyte interface (SEI) as charge/discharge cycles progress.

These are but three of the many examples that have demonstrated that the effectiveness of presently invented strategy of implementing an electrolyte polymer as a protecting matrix for anode particles in terms of imparting significantly more stable charge/discharge cycle stability to a lithium-ion battery.

In lithium-ion battery industry, it is a common practice to define the cycle life of a battery as the number of charge-discharge cycles that the battery suffers 20% decay in capacity based on the initial capacity measured after the required electrochemical formation. We have made the following observations:

(a) In general, we have observed that solid electrolyte polymer- or gel electrolyte polymer-protected composite particulates impart a significantly higher cycle life to a lithium-ion battery featuring a high-capacity anode active material.

(b) Simple carbon encapsulation or graphene encapsulation is not sufficient to ensure a long-term cycling stability.

(c) Porous anode active material particles (relative to solid particles) lead to more stable cycling behaviors of lithium-ion cells.

The invention claimed is:

1. Multi-functional composite particulates for a lithium battery, wherein at least one of said composite particulates has a diameter from 100 nm to 50 μm and comprises a polymer electrolyte, comprising from 0.1% to 40% by weight of a lithium salt dissolved or dispersed in said polymer electrolyte, and one or a plurality of primary particles of an anode active material that are encapsulated by, embedded in, dispersed in, or bonded by said polymer electrolyte having a lithium ion conductivity from $10^{-8}$ to $5 \times 10^{-2}$ S/cm, wherein said primary particles have a diameter or thickness from 0.5 nm to 20 μm and occupy a weight fraction from 5% to 98% based on the total weight of the composite particulate.

2. The multi-functional composite particulates of claim 1, wherein said polymer electrolyte comprises a polymer selected from poly(ethylene oxide), polypropylene oxide, poly(ethylene glycol), poly(acrylonitrile), poly(methyl methacrylate), poly(vinylidene fluoride), poly bis-methoxy ethoxyethoxide-phosphazenex, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer electrolyte with a carboxylate anion, a sulfonylimide anion, or sulfonate anion, a crosslinked electrolyte of poly(ethylene glycol)diacrylate or poly(ethylene glycol)methyl ether acrylate, a sulfonated derivative thereof, or a combination thereof.

3. The multi-functional composite particulates of claim 1, wherein said lithium salt is selected from lithium perchlorate (LiClO4), lithium hexafluorophosphate (LiPF6), lithium borofluoride (LiBF4), lithium hexafluoroarsenide (LiAsF6), lithium trifluoro-methanesulfonate (LiCF3SO3), bis-trifluoromethyl sulfonylimide lithium (LiN(CF3SO2)2), lithium bis(oxalato)borate (LiBOB), lithium oxalyldifluoroborate (LiBF2C2O4), lithium nitrate (LiNO3), Li-fluoroalkyl-phosphate (LiPF3(CF2CF3)3), lithium bisperfluoro-ethyl-sulfonylimide (LiBETI), lithium bis(trifluoromethanesulfonyl)imide, lithium bis(fluorosulfonyl)imide, lithium trifluoromethanesulfonimide (LiTFSI), an ionic liquid-based lithium salt, or a combination thereof.

4. The multi-functional composite particulates of claim 1, wherein said polymer electrolyte is further impregnated with an organic liquid solvent, an ionic liquid, or a combination thereof.

5. The multi-functional composite particulates of claim 1, wherein said composite particulate is further encapsulated by a shell of conducting material selected from graphene, carbon, graphite, conducting polymer, metal, composite, or a combination thereof, wherein said shell has an electrical conductivity from 10-8 S/cm to 103 S/cm and a thickness from 0.34 nm to 10 μm.

6. The multi-functional composite particulates of claim 1, wherein said composite particulate further comprises graphene sheets dispersed in said polymer electrolyte and said graphene sheets are selected from pristine graphene, graphene fluoride, graphene chloride, graphene bromide, graphene iodide, nitrogenated graphene, hydrogenated graphene, doped graphene, chemically functionalized graphene, a combination thereof, or a combination thereof with graphene oxide or reduced graphene oxide.

7. The multi-functional composite particulates of claim 1, wherein said polymer electrolyte further comprises a reinforcement material or additive selected from carbon nanotubes, carbon nano-fibers, carbon or graphite fibers, graphene sheets, expanded graphite flakes, polymer fibrils, glass fibers, ceramic fibers, metal filaments or metal nanowires, whiskers, carbon black, acetylene black, needle coke, carbon particles, graphite particles, or a combination thereof.

8. The multi-functional composite particulates of claim 1, wherein said anode active material is selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li having at least 60% by weight of lithium element therein; and (h) combinations thereof.

9. The multi-functional composite particulates of claim 8, wherein said Li alloy contains from 0.1% to 10% by weight of a metal element selected from Zn, Ag, Au, Mg, Ni, Ti, Fe, Co, V, Al, or a combination.

10. The multi-functional composite particulates of claim 1, wherein said anode active material contains a prelithiated Si, prelithiated Ge, prelithiated Sn, prelithiated SnOx, prelithiated SiOx, prelithiated iron oxide, prelithiated Mn3O4, prelithiated Co3O4, prelithiated Ni3O4, lithium titanate, lithium niobite, or a combination thereof, wherein x=1 to 2.

11. The multi-functional composite particulates of claim 1, wherein said primary particles of anode active material are in a form of nanoparticle, nanowire, nanofiber, nanotube, nanosheet, nanobelt, nanoribbon, nanodisc, nanoplatelet, or nanohorn having a thickness or diameter from 0.5 nm to 100 nm.

12. The multi-functional composite particulates of claim 1, wherein at least one of said primary anode active material particles is coated with a layer of carbon, graphite, or graphene.

13. The multi-functional composite particulates of claim 1, wherein said composite further comprises from 0.1% to 40% by weight of a lithium ion-conducting additive dispersed in said polymer electrolyte.

14. The multi-functional composite particulates of claim 13, wherein said lithium ion-conducting additive is selected from Li2CO3, Li2O, Li2C2O4, LiOH, LiX, ROCO2Li, HCOLi, ROLi, (ROCO2Li)2, (CH2OCO2Li)2, Li2S, LixSOy, or a combination thereof, wherein X=F, Cl, I, or Br, R=a hydrocarbon group, $0<x \leq 1$, $1 \leq y \leq 4$.

15. The multi-functional composite particulates of claim 1, wherein said primary particles of anode active material contain porous particles having surface pores, internal pores, or both surface pores and internal pores.

16. A powder mass comprising the multi-functional composite particulates of claim 1.

17. A battery anode electrode comprising the multi-functional composite particulates of claim 1 as an anode material.

18. A battery containing the battery anode of claim 17, which is a lithium-ion battery, lithium metal battery, lithium-sulfur battery, lithium-air battery, or lithium-selenium battery.

19. A method of producing the multi-functional composite particulates of claim 1, comprising (A) dispersing a plurality of primary particles of an anode active material, having a diameter or thickness from 0.5 nm to 20 μm, in a liquid mixture of a monomer or oligomer for a conjugated polymer, an initiator, and a cross-linking agent to form a reactive slurry; (B) forming the reactive slurry into micro-droplets and polymerizing and curing the monomer or oligomer in said micro-droplets to form the multi-functional particulates.

20. The method of claim 19, wherein said reactive slurry further comprises a reinforcement material, a lithium ion-conducting additive, an electron-conducting additive, or a combination thereof.

21. The method of claim 19, wherein said step (B) of forming micro-droplets comprises a procedure selected from pan-coating, air-suspension coating, centrifugal extrusion, vibration-nozzle encapsulation, spray-drying, coacervation-phase separation, interfacial polycondensation or interfacial cross-linking, in-situ polymerization, matrix polymerization, extrusion and palletization, or a combination thereof.

22. The method of claim 19, wherein said micro-droplets contain water or a liquid solvent and the method further comprises a step of removing said water or solvent.

23. The method of claim 19, wherein said reactive slurry further comprises a high-strength material selected from carbon nanotubes, carbon nano-fibers, carbon or graphite fibers, graphene sheets, expanded graphite flakes, polymer fibrils, glass fibers, ceramic fibers, metal filaments or metal nano-wires.

24. The method of claim 19, further comprising a step of incorporating said composite particulates into an anode electrode.

25. The method of claim 24, further comprising a step of combining said anode electrode, a cathode electrode, and an electrolyte to form a lithium battery cell.

\* \* \* \* \*